(12) United States Patent
Hiroe et al.

(10) Patent No.: US 10,962,969 B2
(45) Date of Patent: Mar. 30, 2021

(54) INFORMATION-PROCESSING METHOD, INFORMATION-PROCESSING DEVICE, PROGRAM, AND INFORMATION-PROCESSING SYSTEM

(71) Applicant: MITSUBISHI HEAVY INDUSTRIES, LTD., Tokyo (JP)

(72) Inventors: Takaharu Hiroe, Tokyo (JP); Kazunari Ide, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 16/340,297

(22) PCT Filed: Oct. 11, 2017

(86) PCT No.: PCT/JP2017/036839
§ 371 (c)(1),
(2) Date: Apr. 8, 2019

(87) PCT Pub. No.: WO2018/074304
PCT Pub. Date: Apr. 26, 2018

(65) Prior Publication Data
US 2019/0339683 A1 Nov. 7, 2019

(30) Foreign Application Priority Data
Oct. 17, 2016 (JP) .................. 2016-203933

(51) Int. Cl.
*G05B 23/02* (2006.01)
*G06F 17/16* (2006.01)
*G06F 17/18* (2006.01)

(52) U.S. Cl.
CPC ......... *G05B 23/0283* (2013.01); *G06F 17/16* (2013.01); *G06F 17/18* (2013.01)

(58) Field of Classification Search
CPC ..... G05B 23/0283; G06F 17/16; G06F 17/18; G06F 16/285; G06F 16/22;
(Continued)

(56) References Cited

U.S. PATENT DOCUMENTS 6,400,366 B1 *  6/2002  Davies ................. G06T 11/206
                                              345/440
6,741,983 B1 *  5/2004  Birdwell ............. G06F 16/2264
(Continued)

FOREIGN PATENT DOCUMENTS

JP   2000-259223 A    9/2000
JP   H03-007961 B2   9/2000
(Continued)

OTHER PUBLICATIONS

PCT/ISA/210, "International Search Report for International Application No. PCT/JP2017/036839" dated Dec. 26, 2017.
(Continued)

*Primary Examiner* — John E Breene
*Assistant Examiner* — Jeffrey P Aiello
(74) *Attorney, Agent, or Firm* — Kanesaka Berner and Partners LLP

(57) ABSTRACT

An information-processing method is provided, including a step of specifying first data clusters to which the first data each belongs and second data clusters to which the second data each belongs; a step of extracting the first data belonging to one of the first data clusters and the second data acquired at a corresponding time as correspondent data; a step of totalizing the number of pieces of correspondent data included in each of the second data clusters and calculating a total value for each cluster for the second data; and a step of specifying the second data clusters which are transition destinations of the correspondent data in a subsequent time and counting the number of pieces of transition destination
(Continued)

data which is the correspondent data transitioning from each of the second data clusters which are transition sources to the second data clusters which are the transition destinations.

10 Claims, 11 Drawing Sheets

(58) Field of Classification Search
CPC ... G06F 16/2425; G06F 16/284; G06N 20/00; G06N 5/02; G06K 9/6256; G06K 9/6272
USPC ....... 702/2, 179, 181, 182; 703/2, 6; 706/46; 707/E17.089, 999.101, 600, 602, 737
See application file for complete search history.

(56) References Cited

U.S. PATENT DOCUMENTS

| | | | | |
|---|---|---|---|---|
| 2002/0107858 A1* | 8/2002 | Lundahl | ............... | G06K 9/6218 |
| 2007/0192063 A1* | 8/2007 | Abu-El-Zeet | .......... | G05B 17/02 |
| | | | | 702/182 |
| 2008/0126723 A1* | 5/2008 | Ashton | ............... | G06F 11/1456 |
| | | | | 711/162 |
| 2010/0036857 A1* | 2/2010 | Marvasti | ............... | G06F 16/285 |
| | | | | 707/725 |
| 2010/0057662 A1* | 3/2010 | Collier | ................... | G06N 7/005 |
| | | | | 706/52 |
| 2010/0153299 A1* | 6/2010 | Keenan | .................. | G06Q 40/06 |
| | | | | 705/36 R |
| 2013/0091080 A1* | 4/2013 | Duggirala | ............... | G06N 7/005 |
| | | | | 706/12 |
| 2014/0174413 A1 | 6/2014 | Huang et al. | | |
| 2014/0279795 A1* | 9/2014 | Shibuya | ............. | G05B 23/0254 |
| | | | | 706/46 |
| 2015/0379430 A1* | 12/2015 | Dirac | ..................... | G06N 20/00 |
| | | | | 706/12 |
| 2016/0087914 A1* | 3/2016 | Goswami | ............. | H04B 5/0031 |
| | | | | 370/442 |

FOREIGN PATENT DOCUMENTS

| | | |
|---|---|---|
| JP | 2010-039833 A | 2/2010 |
| JP | 1520819 B2 | 5/2010 |
| JP | 2015-076058 A | 4/2015 |
| JP | 2016-507691 A | 3/2016 |

OTHER PUBLICATIONS

Japanese Office Action of Japanese Patent Application No. 2016-203933, dated Feb. 14, 2017.

* cited by examiner

FIG. 4

$$A \leftarrow \begin{bmatrix} a_{1,1} & a_{1,2} & \cdots & a_{1,n_c} \\ a_{2,1} & a_{2,2} & \cdots & a_{2,n_c} \\ \vdots & \vdots & \ddots & \vdots \\ a_{n_c,1} & a_{n_c,2} & \cdots & a_{n_c,n_c} \end{bmatrix} \quad \text{(EXPRESSION 1)}$$

$$a_{i,j} \leftarrow \frac{n_{i,j}(t)}{n_j(t-1)}, (i=1,2,\cdots,n_c, j=1,2,\cdots,n_c) \quad \text{(EXPRESSION 2)}$$

FIG. 5

$$a_{1,1} \leftarrow \frac{n_{1,1}(t)}{n_1(t-1)} = \frac{51}{302} \quad \text{(EXPRESSION 3-1)}$$

$$a_{2,1} \leftarrow \frac{n_{2,1}(t)}{n_1(t-1)} = \frac{43}{302} \quad \text{(EXPRESSION 3-2)}$$

$$a_{3,1} \leftarrow \frac{n_{3,1}(t)}{n_1(t-1)} = \frac{86}{302} \quad \text{(EXPRESSION 3-3)}$$

$$\vdots$$

$$a_{1,2} \leftarrow \frac{n_{1,2}(t)}{n_2(t-1)} = \frac{43}{234} \quad \text{(EXPRESSION 3-4)}$$

$$\vdots$$

$$a_{n_c,n_c} \leftarrow \frac{n_{n_c,n_c}(t)}{n_{n_c}(t-1)} = \frac{13}{198} \quad \text{(EXPRESSION 3-5)}$$

FIG. 6

$$P_{t+1} = AP_t \quad \text{(EXPRESSION 4)}$$

$$\begin{bmatrix} P(IT_1, t+1) \\ P(IT_2, t+1) \\ \vdots \\ P(IT_{n_c}, t+1) \end{bmatrix} = A \begin{bmatrix} P(IT_1, t) \\ P(IT_2, t) \\ \vdots \\ P(IT_{n_c}, t) \end{bmatrix} \quad \text{(EXPRESSION 5)}$$

$$T_{t+1} = \begin{bmatrix} RV(IT_1), RV(IT_2), \cdots RV(IT_{n_c}) \end{bmatrix} \begin{bmatrix} P(IT_1, t+1) \\ P(IT_2, t+1) \\ \vdots \\ P(IT_{n_c}, t+1) \end{bmatrix} \quad \text{(EXPRESSION 6)}$$

FIG. 10

$$n_{i,j}(t) \leftarrow \sum_{n=1,\cdots,N_c} NumberOfSamples \begin{pmatrix} T(t-n) \in \text{CLUSTER IT}_j \text{ FOR OUTPUT DATA } and. \\ T(t-(n-1)) \in \text{CLUSTER IT}_j \text{ FOR OUTPUT DATA} \end{pmatrix} \quad \text{(EXPRESSION 10-1)}$$

$$n_j(t-1) \leftarrow \sum_{n=1,\cdots,N_c} NumberOfSamples \left( T(t-n) \in \text{CLUSTER IT}_j \text{ FOR OUTPUT DATA} \right) \quad \text{(EXPRESSION 10-2)}$$

FIG. 11

$$n_{i,j}(t) \leftarrow n_{i,j}(t-1) + NumberOfSamples \begin{pmatrix} T(t) \in \text{CLUSTER IT}_i \text{ FOR OUTPUT DATA } \& \\ T(t-\Delta) \in \text{CLUSTER IT}_j \text{ FOR OUTPUT DATA} \end{pmatrix}$$ (EXPRESSION 11-1)

$$n_j(t-1) \leftarrow n_j(t-2) + NumberOfSamples\left(T(t-1) \in \text{CLUSTER IT}_j \text{ FOR OUTPUT DATA}\right)$$ (EXPRESSION 11-2)

FIG. 13

| | | |
|---|---|---|
| 586 PIECES | T0+4095 δ<br>T0+4094 δ<br>T0+4093 δ<br>T0+4092 δ<br>T0+4091 δ<br>⋮<br>T0+3511 δ | OUTPUT CLUSTER $IT_7$ |
| 586 PIECES | T0+3510 δ<br>T0+3509 δ<br>T0+3508 δ<br>T0+3507 δ<br>T0+3506 δ<br>⋮<br>T0+2926 δ | OUTPUT CLUSTER $IT_6$ |
| | T0+2925 δ<br>⋮<br>T0+586 δ | ⋮ |
| 586 PIECES | T0+585 δ<br>T0+584 δ<br>T0+583 δ<br>T0+582 δ<br>T0+581 δ<br>⋮<br>T0+0 δ | OUTPUT CLUSTER $IT_1$ | ns
INFORMATION-PROCESSING METHOD, INFORMATION-PROCESSING DEVICE, PROGRAM, AND INFORMATION-PROCESSING SYSTEM

TECHNICAL FIELD

The present invention relates to an information-processing method, an information-processing device, a program, and an information-processing system.

Priority is claimed on Japanese Patent Application No. 2016-203933, filed Oct. 17, 2016, the content of which is incorporated herein by reference.

BACKGROUND ART

In plants such as power plants, acquisition of time-series data such as temperature, pressure, and the like at the time of operations of devices included in the plants by monitoring devices for the devices and use of the acquired information for application to diagnosis of breakdown or the like and various kinds of control of the devices has been examined.

Since an information amount of the time-series data acquired from the devices is sparse, for example, it is difficult to diagnose the devices using the time-series data. Therefore, generation of dynamic characteristic models of the devices based on the time-series data and use of changes in states of the devices as changes in constants of the dynamic characteristic models for diagnosis or the like of the devices has been examined.

The time-series data of the devices has nonlinearity, and thus it is difficult to derive appropriate dynamic characteristic models in addition to the nonlinearity. Therefore, a dynamic characteristic model is generally expressed by linearly approximating nonlinearity (for example, see Patent Literature 1).

CITATION LIST

Patent Literature

Patent Literature 1

Japanese Patent No. 4520819

SUMMARY OF INVENTION

Technical Problem

In the proposed dynamic characteristic model, nonlinearity is linearly approximated. Therefore, an error between the time-series data of a device calculated from the dynamic characteristic model and actual time-series data of the device may be large. Therefore, there is a concern of an error between a predicted value and an actually measured value of data indicating an operation of the device generated using the dynamic characteristic model being large and diagnosis or the like of the device not being appropriately performed.

Accordingly, an object of the present invention is to provide an information-processing method, an information-processing device, a program, and an information-processing system capable of solving the above-described problems.

Solution to Problem

According to an aspect of the present invention, an information-processing method is provided of calculating predicted values of data indicating an operation state of a device. The method includes: a step of acquiring first data of the device during a predetermined period and second data that has a correlation with the first data by a monitoring device; a step of specifying first data clusters to which the first data belongs and second data clusters to which the second data belongs by the monitoring device; a step of extracting the first data belonging to one of the first data clusters and the second data acquired at a corresponding time as correspondent data by the monitoring device; a step of totalizing the number of pieces of correspondent data included in each of the second data clusters and calculating a total value for each second data cluster by the monitoring device; a step of specifying the second data clusters which are transition destinations of the correspondent data in a time subsequent to the corresponding time and counting the number of pieces of transition data which is the correspondent data transitioning from each of the second data clusters which are transition sources to the second data clusters which are the transition destinations by the monitoring device; and a step of calculating a transition probability matrix of the correspondent data based on the total values and the number of pieces of transition data and calculating predicted values of the second data based on the transition probability matrix by the monitoring device. The step of calculating the predicted values of the second data includes a step of calculating a probability distribution of each of the second data clusters based on the number of pieces of second data belonging to the second data clusters by the monitoring device, a step of calculating a probability distribution of each of the second data clusters at a subsequent time based on the transition probability matrix and the probability distribution of each of the second data clusters by the monitoring device, and a step of calculating the predicted value from the probability distribution of each of the second data clusters at a subsequent time and a representative value of each of the second data clusters by the monitoring device.

Advantageous Effects of Invention

The information-processing method, the information-processing device, the program, and the information-processing system described above can appropriately estimate predicted values of time-series data based on time-series data at the time of operation of a device.

BRIEF DESCRIPTION OF DRAWINGS

FIG. 4 is a diagram illustrating examples of calculation expressions of a transition probability matrix according to the embodiment.

FIG. 5 is a diagram illustrating examples of calculation expressions of elements of the transition probability matrix according to the embodiment.

FIG. 6 is a diagram illustrating examples of calculation expressions for predicted values according to the embodiment.

FIG. 10 is a diagram illustrating examples of calculation expressions used for a process of updating the transition probability matrix according to the embodiment.

FIG. 11 is a diagram illustrating examples of calculation expressions used for the process of updating the transition probability matrix according to the embodiment.

FIG. 13 is a diagram illustrating examples of output clusters according to the embodiment.

DESCRIPTION OF EMBODIMENTS

First Embodiment

<System Configuration>

Figure 1:
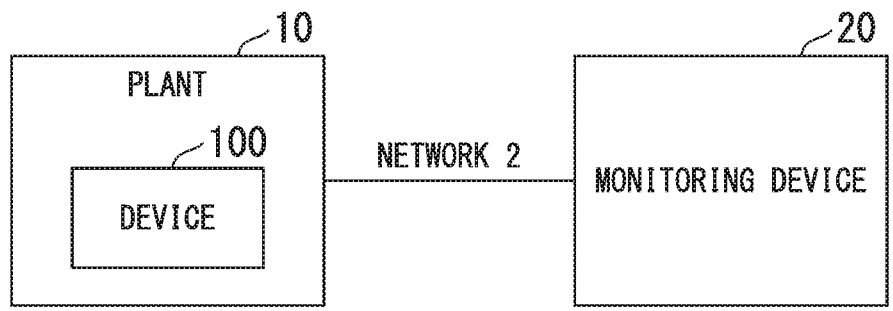
FIG. 1 is a diagram illustrating an example of a monitoring system according to an embodiment.

A monitoring system 1 according to an embodiment will be described with reference to FIG. 1. The monitoring system 1 includes a plant 10, a device 100 disposed in the plant 10, and a monitoring device 20. The device 100 and the monitoring device 20 transmit and receive data via a network 2. The type of the network 2 is not particularly limited.

The device 100 notifies the monitoring device 20 of a plurality of kinds of operation data mutually related to the device 100 within a predetermined period via the network 2. The monitoring device 20 calculates a transition probability matrix which is used to calculate predicted values of operation data based on the operation data that is notified of. The monitoring device 20 calculates predicted values of the operation data based on the calculated transition probability matrix. A specific calculation procedure will be described later.

In the embodiment, the device 100 is a boiler, a gas turbine, a corrugator, or the like disposed in the plant 10.

The monitoring device 20 acquires actually measured values of the operation data at a time after a predetermined period from the device 100 and specifies differences between the predicted values and the actually measured values. The monitoring device 20 determines that the device 100 is operating normally when a specified difference is less than a predetermined threshold, and determines that an abnormality occurs in the device 100 when a specified difference is equal to or greater than a predetermined threshold.

<Method of Calculating Predicted Values>

Next, a method of calculating predicted values will be described with reference to FIGS. 2 to 6. The method of calculating predicted values according to the embodiment includes calculating a transition probability matrix calculated from input data and output data during a predetermined period, generating a master equation based on the calculated transition probability matrix and a probability distribution of the output data, and calculating predicted values of the output data using the master equation.

(1) Calculating Transition Probability Matrix

First, a method of calculating a transition probability matrix will be described. Here, a case in which the monitoring device 20 acquires input data u and output data T during a predetermined period as operation data of the device 100 will be described. The input data u and the output data T are data that have a correlation. The input data u is a control input value to the control target device 100. The output data T is an output value from the control target device 100 and is data indicating an operation state of the device 100 in accordance with the input data u (a control input value). For example, the input data u is the opening degree of a valve of the device 100 (a boiler or the like) and the output data T is temperature data of the device 100.

The input data u may be referred to as first data and the output data T may be referred to as second data. Here, a series of input data u acquired by the monitoring device 20 is expressed as $\{u_1, u_2, \ldots, u_{Nt}\}$ and a series of output data T is expressed as $\{T_1, T_2, \ldots, T_{Nt}\}$. Here, the subscripts indicate times at which operation data is acquired and $T_{Nt}$ is output data acquired at time Nt. When input data at any time is expressed, the input data is simply expressed as u. When any output data is expressed, the output data is simply expressed as T.

The monitoring device 20 divides the input data u into $n_c$ clusters. Here, clusters for input data (hereinafter referred to as input clusters) are expressed as $\{Iu_1, Iu_2, \ldots, Iu_{nc}\}$. The input clusters may be referred to as first data clusters. The subscripts of the input clusters Iu indicate input cluster Iu numbers. For example, the monitoring device 20 divides the clusters so that the input data u with values 100 to 109 is included in $Iu_1$, the input data u with values 110 to 119 is included in $Iu_2$, and the input data u with values ($100+10 \times n_c$) to ($100+10 \times n_c+9$) is included in $Iu_{nc}$. When any input cluster is expressed, the input cluster is simply expressed as an input cluster Iu.

The monitoring device 20 divides the output data T into $n_c$ clusters. Here, clusters for output data (hereinafter referred to as output clusters) are expressed as $\{IT_1, IT_2, \ldots, IT_{nc}\}$. The output clusters may be referred to as second data clusters. The subscripts of the output clusters IT indicate output cluster IT numbers. Cluster division similar to that of the input data u can also be applied to cluster division of the output data T. When any output cluster is expressed, the output cluster is simply described as an output cluster IT. The number of input clusters and the number of output clusters may be other numbers.

Subsequently, the monitoring device 20 specifies the output clusters IT to which the output data T corresponding to each piece of input data u belonging to the input clusters Iu belongs, totalizes the number of pieces of output data T belonging to each of the output clusters IT, and calculates a total value. Here, the input data u and the output data T (correspondent data) corresponding to the input data u are, for example, data acquired at the same time from the device 100.

For example, when input data $u_{ta}$ at time ta is assigned to the input cluster $Iu_1$ and output data $T_{ta}$ at time ta is assigned to the cluster $IT_2$, the monitoring device 20 increases a total value of the output data T of the output cluster $IT_2$ with regard to the input cluster $Iu_1$ by 1.

Figure 2:
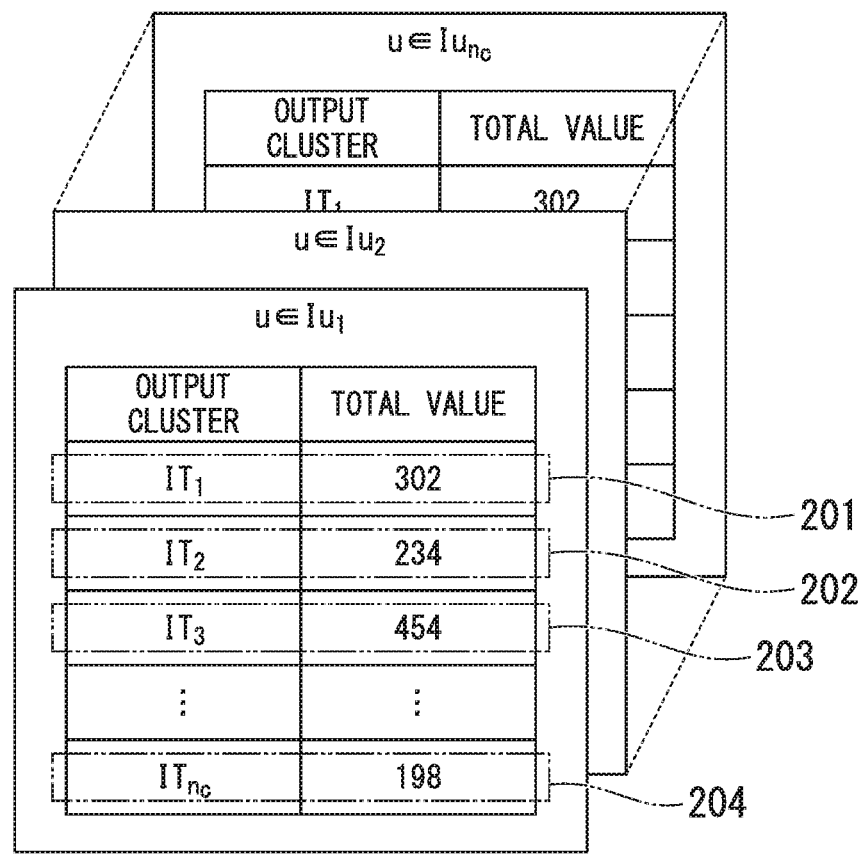
FIG. 2 is a diagram illustrating an example of a total value for each output cluster according to the embodiment.

FIG. 2 illustrates a relationship between the input cluster $Iu_1$ and the output cluster IT to which the output data T corresponding to the input data u belonging to the input cluster $Iu_1$ belongs. Specifically, as illustrated in FIG. 2, of the output data T corresponding to the input data u belonging to the input cluster $Iu_1$, the number of pieces of output data T belonging to the cluster $IT_1$ is 302 (as denoted by reference numeral 201), the number of pieces of output data T belonging to the output cluster $IT_2$ is 234 (as denoted by reference numeral 202), the number of pieces of output data T belonging to the output cluster $IT_3$ is 454 (as denoted by reference numeral 203), and the number of pieces of output data T belonging to the output cluster $IT_{nc}$ is 198 (as denoted by reference numeral 204).

After the process of associating the input clusters Iu with the output clusters IT is completed, the monitoring device 20 specifies the output clusters IT to which the output data T belonging to the output cluster IT is to transition at a subsequent time, that is, a subsequent data acquisition timing. Then, the monitoring device 20 counts the number of pieces of output data T transitioning to each of the output clusters IT at the subsequent time. For example, when the input data $u_{ta}$ at time ta is assigned to the input cluster $Iu_1$ and the output data $T_{ta}$ at time ta is assigned to the output cluster $IT_2$ and then output data $T_{ta+1}$ at subsequent time ta+1 transitions to the output cluster $IT_5$, the monitoring device 20 specifies that the output data T (correspondent data) corresponding to the input cluster $I_{u1}$ transitions from the output cluster $IT_2$ to the output cluster $IT_5$. Then, the monitoring device 20 increases the number of pieces of output data T (transition data) transitioning from the output cluster $IT_2$ to the output cluster $IT_5$ by 1.

Here, the transition data is correspondent data transitioning from each of the output clusters IT which are transition sources to each of the output clusters IT which are transition destinations. The transition data includes a case in which the output clusters IT which are the transmission sources are the same as the output clusters IT which are the transition destinations.

Figure 3:
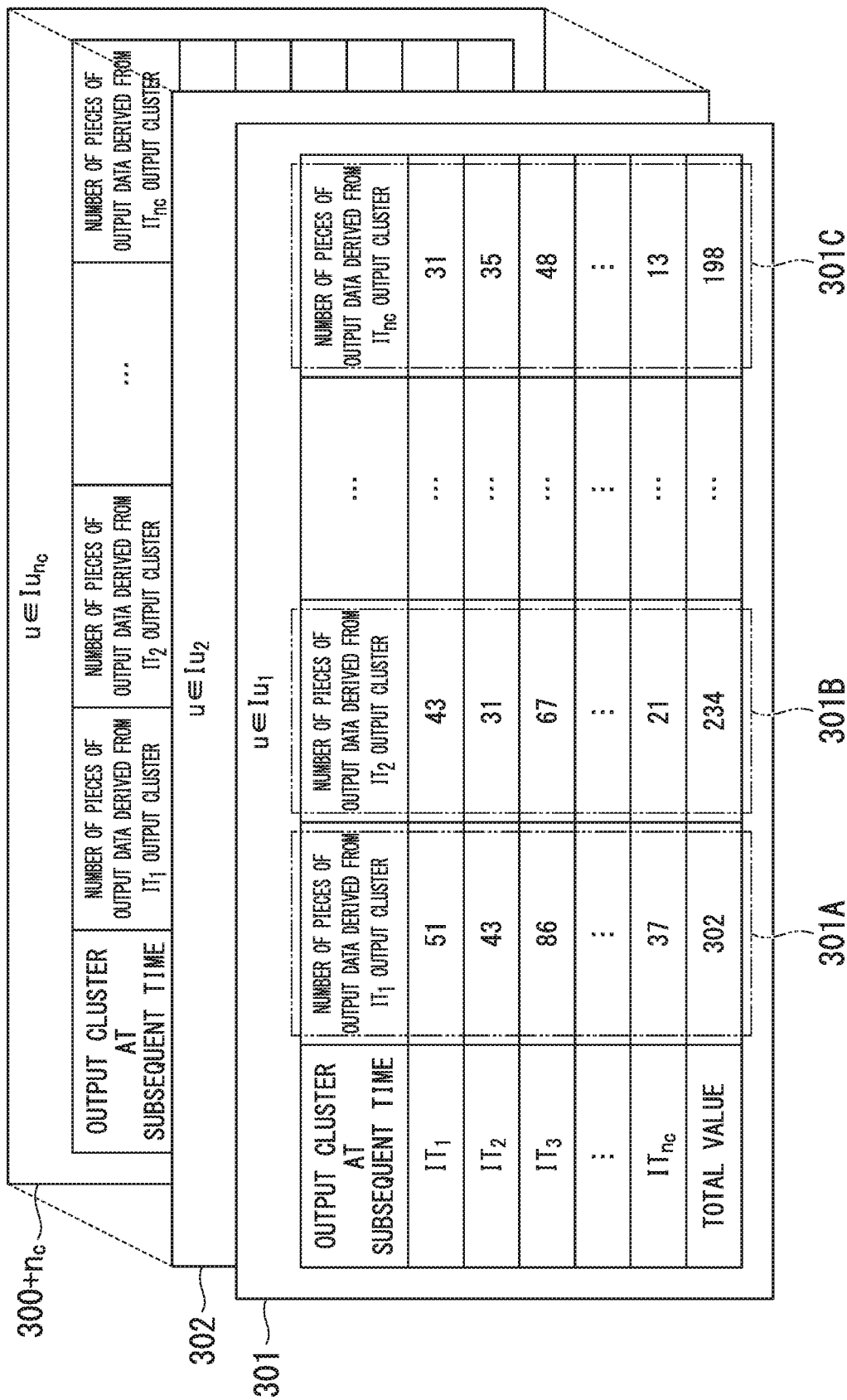
FIG. 3 is a diagram illustrating examples of transition relation tables according to the embodiment.

FIG. 3 is a diagram illustrating examples of transition relation tables (301 to 300+$n_c$). The transition relation tables (301 to 300+$n_c$) are tables generated when the monitoring device 20 counts the number of pieces of output data included for each combination of an output cluster $IT_j$ which is a transition source and an output cluster $IT_i$ which is a transition destination.

The transition relation table 301 shows a relationship between the output cluster $IT_j$ which is the transition source of the output data T associated with the input cluster $Iu_1$ and the output cluster $IT_i$ which is the transition destination. The transition relation table 301 includes a total value of the output data T included in each output cluster $IT_j$ which is the transition source.

For example, a column 301A indicates that a total value of the output data T in which u belongs to the input cluster $Iu_1$ and T belongs to the output cluster $IT_1$ is 302 and indicates that, of the output data T derived from the output cluster $IT_1$, 43 pieces of output data T transition to the output cluster $IT_2$, 86 pieces of output data T transition to the output cluster $IT_3$, 37 pieces of output data T transition to the output cluster $IT_{nc}$, and 51 pieces of output data T remain in the output cluster $IT_1$ at a subsequent time.

Similarly, a column 301B indicates the number of pieces of output data T included in each of the output clusters IT which are transition destinations of the output data T belonging to the output cluster $IT_2$. A column 301C indicates the number of pieces of output data T included in each of the output clusters IT which are transition destinations of the output data T belonging to the output cluster $IT_{nc}$.

The monitoring device 20 generates the transition relation table of each input cluster Iu.

A method of calculating a transition probability matrix will be described with reference to FIGS. 4 and 5. The monitoring device 20 calculates a transition probability matrix A using the transition relation table of each input cluster Iu.

In FIG. 4, Expression 1 indicates the transition probability matrix A and an element $a_{i,j}$ in the transition probability matrix A is expressed in Expression 2. Here, a denominator $n_j(t-1)$ of Expression 2 is a total value of the output data T included in the output cluster $IT_j$ at time (t-1) and a numerator $n_{i,j}(t)$ of Expression 2 is the number of pieces of output data T moved from the output cluster $IT_j$ to the output cluster $IT_i$ at time t which is a subsequent time of time (t-1). The monitoring device 20 calculates a transition probability matrix using Expressions 1 and 2.

A method of calculating elements of the transition probability matrix will be described specifically with reference to FIG. 5. In FIG. 5, Expressions 3-1 to 3-5 indicate calculation of a value of each element of the transition probability matrix of the input cluster $Iu_j$ based on the transition relation table 301 in FIG. 3.

Expression 3-1 is a calculation expression for a value of the element $a_{1,1}$. Here, $n_{1,1}(t)$ is the number of pieces of output data T continuously belonging to the output cluster $IT_1$ at the time of the transition from time (t-1) to time t. In this case, $n_{1,1}(t)$ is 51. In addition, $n_1(t-1)$ is a total value of the output data T included in the output cluster $IT_1$ at time (t-1). In this case, $n_1(t-1)$ is 302.

Expression 3-2 is a calculation expression for a value of the element $a_{2,1}$. Here, $n_{2,1}(t)$ is the number of pieces of output data T transitioning to the output cluster $IT_2$ at time t of the output data T belonging to the output cluster $IT_1$ at time (t-1). In this case, $n_{2,1}(t)$ is 43. In addition, $n_1(t-1)$ is 302 as in Expression 3-1.

Expression 3-3 is a calculation expression for a value of the element $a_{3,1}$, Expression 3-4 is a calculation expression for a value of the element $a_{1,2}$, and Expression 3-5 is a calculation expression for a value of the element $a_{nc,nc}$. The values of these elements are calculated in a procedure similar to that of Expression 3-2.

(2) Calculating Predicted Values of Output Data

A method of calculating predicted values of the output data T will be described. The predicted values of the output data T are calculated based on the transition probability matrix A and a probability distribution P for each output cluster IT. To calculate the predicted values of the output data T, the monitoring device 20 calculates prediction of the probability distribution P at a time at which the predicted values are calculated. The prediction of the probability distribution P is calculated by master equations of Expressions 4 and 5.

$P_t$ is a probability distribution for each output cluster IT at time t and is calculated based on the output data T acquired from the device 100. $P_{t+1}$ is prediction of the probability distribution for each output cluster IT at time t+1 at which the predicted values are calculated. The probability distribution for each output cluster IT is obtained by dividing the number of pieces of output data T included in each of the output clusters $\{IT_1, IT_2, \ldots, IT_{nc}\}$ by a sum of the number of pieces of output data T acquired during a predetermined period, that is, a sum of the number of samples of the output data T. When the probability distribution P is expressed in a determinant format, the probability distribution P is expressed as in Expression 5. For example, $P(IT_1, t)$ indicates a probability that there is the output data T in the output cluster $IT_1$ at time t and $P(IT_{nc}, t+1)$ indicates a probability that there is the output data T in the output cluster $IT_{nc}$ at time t+1.

By performing Expression 5, that is, multiplying the transition probability matrix A by the probability distribution $P_t$, $P_{t+1}$ which is prediction of the probability distribution at time t+1 is calculated.

The monitoring device 20 calculates the probability distribution $P_{t+1}$ at time t+1 using Expression 5, and then calculates a predicted value of the output data $T_{t+1}$ at time t+1 using Expression 6. Here, as a representative value RV in Expression 6, a representative value in each cluster is set.

For example, the representative value in the output cluster $IT_1$ is set as the representative value RV ($IT_1$), the representative value in the output cluster $IT_2$ is set as the representative value RV ($IT_2$), and the representative value in the output cluster $IT_{nc}$ is set as the representative value RV ($IT_{nc}$).

Thus, the monitoring device 20 can appropriately calculate the predicted values of the output data based on the input data and the output data.

The input data and the output data generally have nonlinearity. However, in the above-described method of calculating the predicted values of the output data, linear approximation of the input data and the output data is not performed when the predicted values are calculated. According to the method of calculating the predicted values of the output data by the monitoring device 20, an error does not occur due to the linear approximation. Therefore, it is possible to predict accurate output data.

The above-described method of calculating the predicted values of the output data has advantages that the transition matrix can be calculated based on the transition of the output data and it is not necessary for an operator of the monitoring device 20 to set, for example, a complicated procedure such as setting of inverse matrix calculation as in derivation of a linear regression model.

Here, as the representative value RV, a central value of the output cluster may be set. In this case, for example, RV ($IT_1$) is assumed to be "(upper limit of $IT_1$+lower limit of $IT_1$)/2."

As the representative value RV, an average value of the output data T included in the output cluster may be set. In this case, accuracy of the predicted values is improved. In particular, for example, when the numbers of pieces of output data T and input data u are small and distributions of values of the output data T and the input data u are not uniform, accuracy of the predicted values is improved.

According to the above-described embodiment, the predicted values of the output data T are calculated based on one kind of input data u, but the predicted values of the output data T may be calculated based on a plurality of kinds of input data. In this case, the plurality of kinds of input data are assigned to the input clusters. For example, the opening degree of a valve, a pressure amount of fuel, and the like of the device 100 are set as the plurality of kinds of input data. At this time, the totalizing in FIGS. 2 and 3 is performed for each combination of first inputs and second inputs. That is, in the case of only the first inputs, as illustrated in FIGS. 2 and 3, the total number is the same as the number of clusters of the first inputs. When the second inputs are added, the total number is the number of combinations of the first inputs and the second inputs. Therefore, for example, when the second inputs are divided into $n_c$ as in the first inputs, the total number is $n_c^2$. Further, when outputs of the target device are complicated and also depend on sampling values at the previous time, the totaling of FIGS. 2 and 3 is performed for each combination of the first inputs, the second inputs, the outputs at the previous time. In this case, the total number is $n_c^3$. Processes other than the cluster division and the totaling based on the cluster division are similar to those when one kind of input data u is input. In this way, by increasing the combinations of totalizing, countermeasures can be easily taken even when characteristics of the target device are complicated.

<Hardware Configuration>

Figure 7:
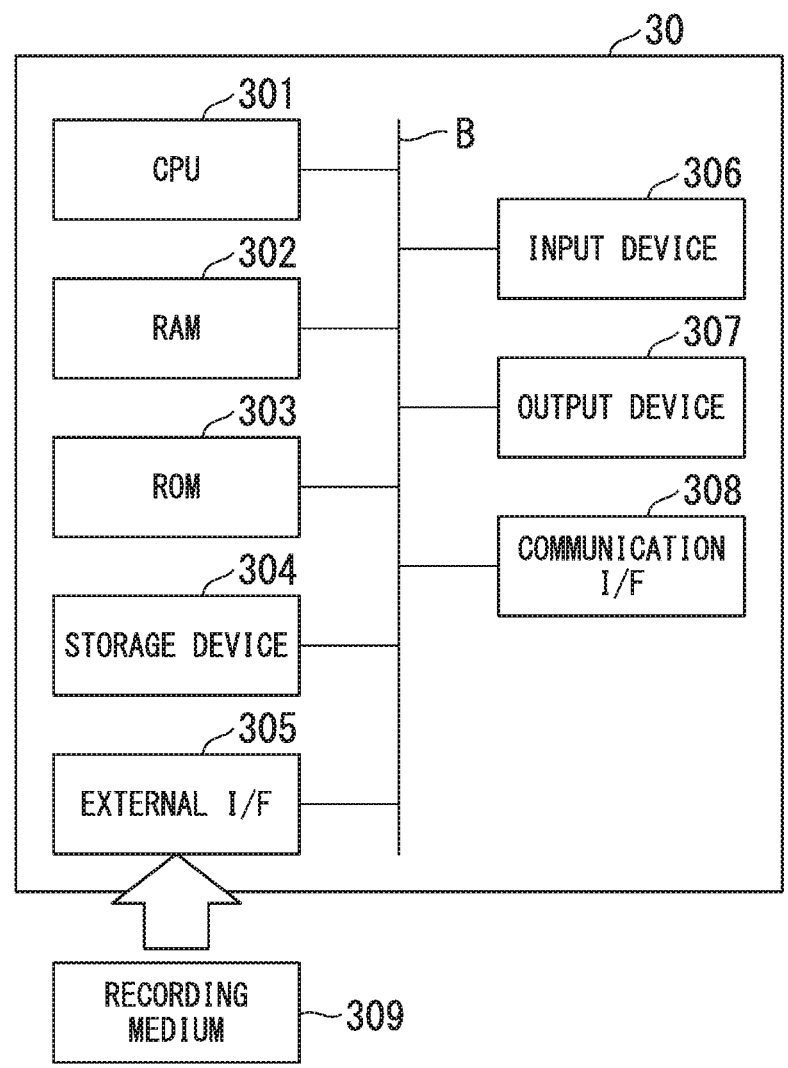
FIG. 7 is a diagram illustrating an example of a hardware configuration of a computer according to the embodiment.

The monitoring device 20 can be realized using an information-processing device, for example, a general computer 30. FIG. 7 is a diagram illustrating an example of a configuration of the computer 30.

The computer 30 includes a central processing unit (CPU) 301, a random-access memory (RAM) 302, a read-only memory (ROM) 303, a storage device 304, an external interface (I/F) 305, an input device 306, an output device 307, and a communication I/F 308.

The CPU 301 is an arithmetic device that realizes each function of the computer 30 by reading a program or data stored in the ROM 303 on the RAM 302, the storage device 304, or the like and performing a process. The RAM 302 is a volatile memory that is used as a work area or the like of the CPU 301. The ROM 303 is a nonvolatile memory that retains a program or data even when power is off. The storage device 304 is realized by, for example, a hard disk drive (HDD), a solid-state drive (SSD), or the like and stores an operation system (OS), an application program, various kinds of data, and the like.

The external I/F 305 is an interface of an external device. As the external device, for example, a recording medium 309 or the like can be exemplified. The computer 30 can perform reading and writing of the recording medium 309 via the external I/F 305. Examples of the recording medium 309 include an optical disc, a magnetic disk, a memory card, and a universal serial bus (USB) memory.

The input device 306 includes, for example, a mouse and a keyboard, and receives instructions from an operator and inputs various operations or the like on the computer 30.

The output device 307 is realized by, for example, by a liquid crystal display and displays a processing result by the CPU 301.

The communication I/F 308 is an interface connecting the computer 30 to a network through wired communication or wireless communication. A bus B is connected to each of the constituent devices and transmits and receives various control signals or the like to and from a control device.

<Functional Configuration>

(1) Monitoring Device 20

Figure 8:
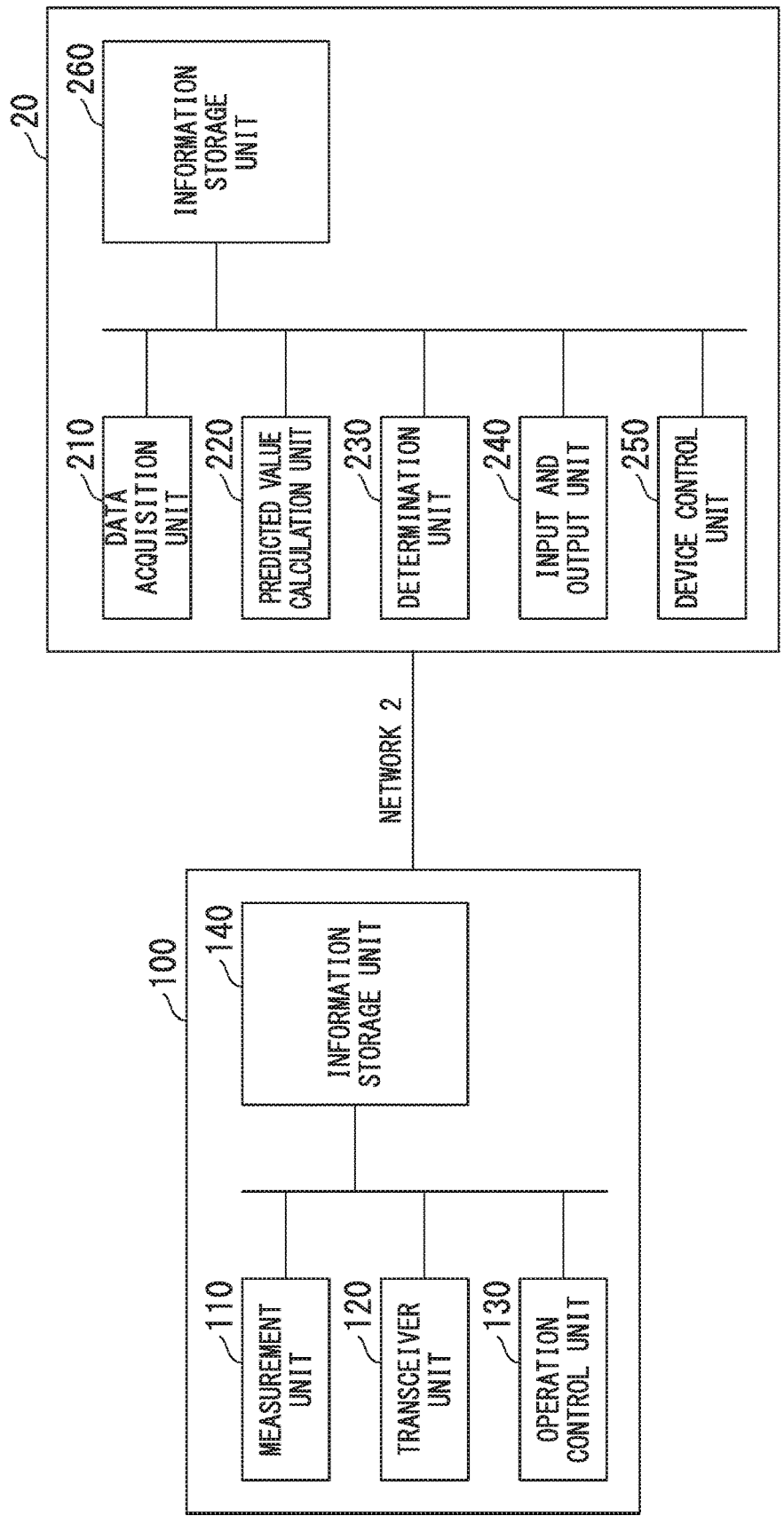
FIG. 8 is a diagram illustrating an example of a functional configuration of a monitoring system according to the embodiment.

A functional configuration of the monitoring device 20 according to the embodiment will be described with reference to FIG. 8. The monitoring device 20 includes a data acquisition unit 210, a predicted value calculation unit 220, a determination unit 230, an input and output unit 240, and a device control unit 250. These functions are realized by causing the CPU 301 to execute one or more programs stored in the ROM 303 or the like. The monitoring device 20 includes an information storage unit 260. The information storage unit is realized by, for example, the storage device 304.

The data acquisition unit 210 acquires the input data u and the output data T from the device 100 disposed in the plant.

The predicted value calculation unit 220 calculates the transition probability matrix A based on the input data u and the output data T acquired by the data acquisition unit 210. The predicted value calculation unit 220 calculates the probability distribution $P_t$ of the output data T at time t. The predicted value calculation unit 220 calculates the prediction $P_{t+1}$ of the probability distribution of the output data T at time t+1 based on the transition probability matrix A and the probability distribution $P_t$. Here, the predicted value calculation unit 220 calculates the predicted value $T_{t+1}$ of the output data T at time t+1 based on the prediction $P_{t+1}$ of the probability distribution and the representative value RV of each output cluster IT. Here, the predicted value calculation unit 220 specifies a range of each input cluster Iu, a range of each output cluster IT, and the representative value RV of the output cluster IT with reference to the information storage unit 260.

The determination unit 230 calculates a difference D between the predicted value $T_{t+1}$ of the output data T at time t+1 and an actually measured value T+1. Here, the difference D is calculated by an expression, "difference D=|predicted value $T_{t+1}$−actually measured value $T'_{t-1}$|." When the difference D is equal to or less than a predetermined threshold Th, the determination unit 230 determines that the device 100 is normally operating. When the difference D is equal to or greater than the predetermined threshold Th, the determination unit 230 determines that the device 100 is normally operating. The determination unit 230 notifies the input and output unit 240 of a determination result.

The input and output unit 240 receives setting of the input clusters Iu, setting of the output clusters IT, setting of the representative value RV, setting of the threshold Th, and the like from the operator of the monitoring device 20.

The input and output unit 240 displays an operation state of the device 100, a determination result of normality, and the like on a display. The input and output unit 240 may notify another device, for example, a terminal for an operation, of the operation state of the device 100, the determination result of normality, and the like.

The device control unit 250 receives an instruction of the input and output unit 240 and performs control on the device 100. When it is determined that the device 100 is not normally operating, the device control unit 250 may perform a predetermined operation for the device 100, for example, an operation of stopping the device 100, an operation of decreasing a use rate of the device 100, or the like.

The information storage unit 260 stores various kinds of data. The information storage unit 260 stores the input data u and the output data T acquired by the data acquisition unit 210. The information storage unit 260 stores the setting of the input clusters Iu, the setting of the output clusters IT, the setting of the representative value RV, the setting of the threshold Th, and the like.

(2) Device

Next, a functional configuration of the device 100 will be described with reference to FIG. 9. The device 100 includes a measurement unit 110, a transceiver unit 120, an operation control unit 130, and an information storage unit 140.

The measurement unit 110 measures the input data u and the output data T of the device. The measurement unit 110 may measure the input data u and the output data T based on an instruction from the monitoring device 20. The transceiver unit 120 transmits the input data u and the output data T of the device to the monitoring device 20 via the network 2. The transceiver unit 120 transmits and receives various signals to and from the monitoring device 20 via the network 2. The operation control unit 130 performs various kinds of control on the device 100. The operation control unit 130 may control the device 100 based on an instruction from the monitoring device 20. The information storage unit 140 stores various kinds of data related to the measured input data u and output data T and the control of the device 100.

<Processing Procedure>

A process of calculating predicted values by the monitoring device 20 will be described with reference to FIGS. 9 to 11.

Figure 9:
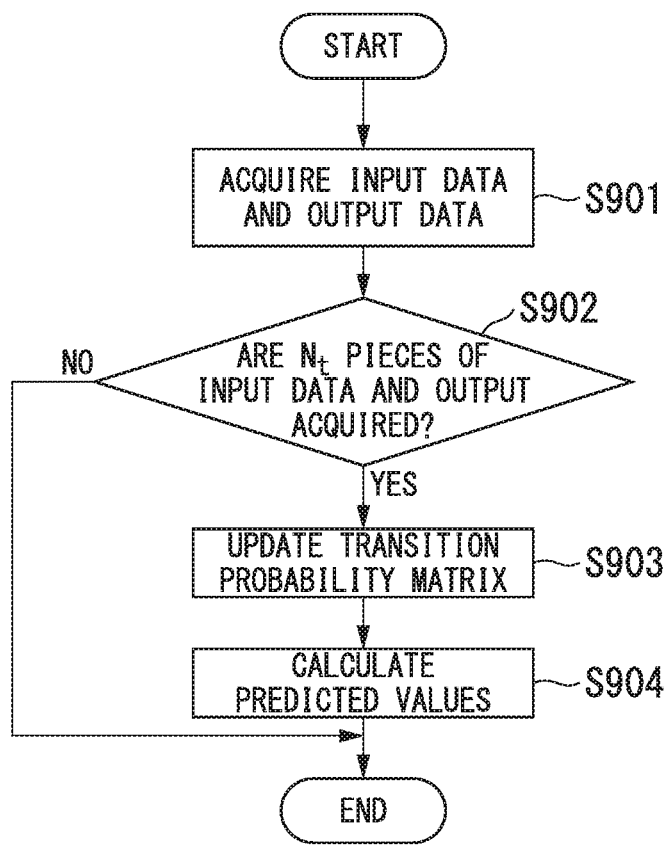
FIG. 9 is a diagram illustrating an example of an operation flow according to the embodiment.

FIG. 9 is a diagram illustrating an example of an operation flow of the calculation of the predicted values by the monitoring device 20. The operation flow is performed at each sampling time.

In step S901, the data acquisition unit 210 acquires the input data u and the output data T of the device 100 during a predetermined period.

In step S902, the predicted value calculation unit 220 determines whether Nt (where Nt is a natural number) pieces of input data u and output data T are acquired. When the Nt pieces of input data u and output data T are acquired (Yes in step S902), the process proceeds to step S903. Conversely, when the Nt pieces of input data u and output data T are not acquired (No in step S902), steps S903 and S904 are not performed.

In step S903, the predicted value calculation unit 220 updates the transition probability matrix A using the latest Nt pieces of input data u and output data T.

In step S904, the predicted value calculation unit 220 calculates the predicted values of the output data T.

The predicted value calculation unit 220 performs a process of updating the transition probability matrix of step S903 using Expressions 10-1 and 10-2 of FIG. 10.

Expression 10-1 is an expression for calculating a value of each element of the transition relation table (see FIG. 3), and "$n_{i,j}(t-1)$" indicates a value of an i-th row and a j-th column of the transition relation table and indicates the number of pieces of output data T transitioning from the output cluster $IT_j$ to the output cluster $IT_i$ at time t subsequent to time (t−1). "Number Of Samples" indicates the number of correspondent data.

Expression 10-2 is an expression for calculating a total value of the correspondent data included in each column of the transition relation table. In addition, "$n_j(t-1)$" indicates a total value of the number of pieces of correspondent data which are at the j-th column at time (t−1) of the transition relation table.

The transition probability matrix is calculated by inputting the calculated value ($n_{i,j}(t-1)$) of each element of the transition relation table and the total value ($n_j(t-1)$) of each column of the transition relation table to Expression 2.

The case in which the transition probability matrix is updated when the Nt pieces of input data u and output data T are acquired has been described with reference to FIG. 9. To calculate accurate predicted values using the transition probability matrix, the predicted value calculation unit 220 may increase an updating frequency of the transition probability matrix. For example, the transition probability matrix when the new input data u and output data T are acquired may be updated. In this case, each element of the transition relation table is calculated using Expression 11-1 of FIG. 11 and a total value of each column of the transition relation table is calculated using Expression 11-2 of FIG. 11.

Specifically, the predicted value calculation unit 220 specifies the output cluster $IT_i$ to which the newly acquired output data $T_t$ belongs at the immediately previous time (t−1) and the output cluster $IT_j$ to which the output data $T_t$ belongs at time (t). Here, it is assumed that an output cluster $IT_{i'}$ to which the output data $T_{t-1}$ belongs at the immediately previous time (t−1) and an output cluster $IT_{j'}$ to which the output data $T_t$ belong at time t are specified.

The monitoring device 20 increases the value of the element at an i'-th row and a j'-th column of the transition relation table at immediately previous time (t−1) by "1." Thus, $n_{i,j}$ at time (t) is calculated. The monitoring device 20 increase $n_j'$ at immediately previous time (t−1) by 1. That is, the total value of the element at the j' column is increased by 1. The transition probability matrix is updated by inputting the calculated $n_{i,j}$ and $n_j$ to Expression 2.

In the embodiment, the calculation of the transition probability matrix A based on the number of pieces of output data T transitioning from the output cluster $IT_j$ to the output cluster $IT_i$ at immediately previous time (t−1) to subsequent time (t) has been described, but other embodiments are not limited to this aspect. For example, the monitoring device 20 may calculate the transition probability matrix A using the number of pieces of output data T transitioning from an output cluster $IT_k$ to the output cluster $IT_j$ at more previous time (t−2) to immediately previous time (t−1) and the number of pieces of output data T transitioning from the output cluster $IT_j$ to the output cluster $IT_i$ at immediately previous time (t−1) to subsequent time (t).

In this way, since the transition probability matrix A also includes information regarding transition probabilities from the more previous output data T, the more accurate prediction can be made.

Figure 12:
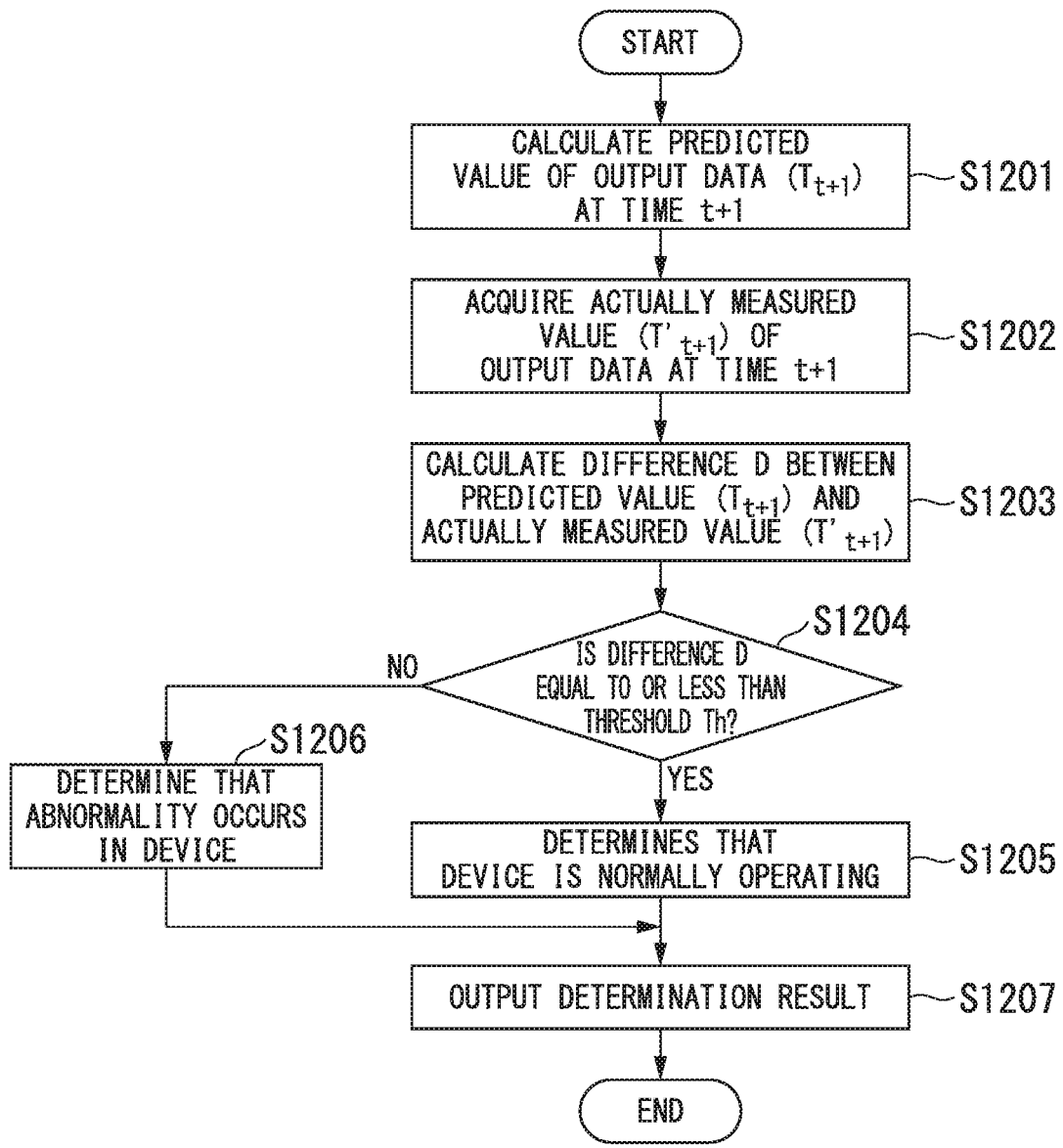
FIG. 12 is a diagram illustrating an example of an operation flow according to the embodiment.

Next, a process of determining abnormality of the device 100 by the monitoring device 20 will be described with reference to FIG. 12.

In step S1201, the predicted value calculation unit 220 calculates a predicted value $T_{t+1}$ of output data $T_{t+1}$ at subsequent time t+1.

In step S1202, the data acquisition unit 210 acquires an actually measured value $T'_{t+1}$ at time t+1.

In step S1203, the predicted value calculation unit 220 calculates a difference D between the predicted value $T_{t+1}$ and the actually measured value $T'_{t+1}$.

In step S1204, the determination unit 230 determines whether the difference D is equal to or less than the threshold Th. When the difference D is equal to or less than the threshold Th (Yes in step S1204), the process proceeds to step S1205. When the difference D is greater than the threshold Th (No in step S1204), the process proceeds to step S1206.

In step S1205, the determination unit 230 determines that the device 100 is normally operating.

In step S1206, the determination unit 230 determines that abnormality occurs in the device 100.

In step S1207, the input and output unit 240 outputs a determination result by the determination unit 230.

The threshold Th is stored in the information storage unit 260 and a set value is adjusted in accordance with a method of calculating the transition probability matrix. For example, as the updating frequency of the transition probability matrix is higher, the accurate predicted value can be calculated. Therefore, the value of the threshold Th decreases. As the numbers of input clusters Iu and output clusters IT are larger, the accurate predicted values can be calculated. Therefore, the value of the threshold Th decreases.

(Operation and Effects)

As described above, the monitoring device 20 according to the first embodiment performs the step of acquiring the input data u of the device 100 during the predetermined period and the output data T that has the correlation with the input data u; the step of specifying the input clusters Iu to which the input data u each belongs and the output clusters IT to which the output data T each belongs; and the step of extracting the input data belonging to one of the input clusters Iu and the output data T (the correspondent data) acquired at a corresponding time.

The monitoring device 20 further performs the step of totalizing the number of pieces of correspondent data included in each of the output clusters IT and calculating the total value for each output cluster IT (see FIG. 2); and the step of specifying the output clusters IT which are transition destinations of the correspondent data at the time subsequent to the corresponding time (the time at which each piece of correspondent data is obtained) and counting the number of pieces of correspondent data (transition data) transitioning from each of the output clusters IT which are transition sources to each of the output clusters IT which are the transition destinations (see FIG. 3).

The monitoring device 20 further performs the step of calculating the transition probability matrix A of the correspondent data based on the total value for each output cluster IT and the number of pieces of transition data and calculating the predicted values of the output data T based on the transition probability matrix A.

In this way, the monitoring device 20 can express non-linear characteristics of the device 100 disposed in the plant or the like without change (without linear approximation) using the transition probability matrix A of the master equation. That is, in a transfer function in which linear characteristics are the premise, a step of approximating the nonlinear characteristics of the device 100 to linear characteristics is necessary and an error may occur in a prediction result equivalent to the approximation. On the other hand, since such an error does not occur in the monitoring device 20 according to the embodiment, higher accurate prediction can be made.

Accordingly, the monitoring device 20 according to the first embodiment can appropriately (accurately) estimate the predicted values of the time-series data.

In the monitoring device 20 according to the first embodiment, the number of pieces of transition data is calculated for each combination of the output clusters IT which are the transition sources and the output clusters IT which are the transition destinations. Each element of the transition probability matrix A is calculated by dividing the number of pieces of transition data by the total value of the output cluster to which the transition data belongs before the transition.

In this way, a probability at which the output data (the transition data) belonging to a certain output cluster belongs (transitions) to each output cluster at a subsequent time can be obtained for each combination of the output clusters IT which are the transition sources and the output clusters IT which are the transition destinations.

In the step of calculating the predicted values of the output data T, the monitoring device 20 according to the first embodiment performs the step of calculating the probability distribution of each of the output clusters IT based on the number of pieces of output data T belonging to the output clusters IT; the step of calculating the probability distribution of each of the output clusters IT at a subsequent time based on the transition probability matrix A and the probability distribution of each of the output clusters IT; and the step of calculating the predicted values from the probability distribution of each of the output clusters IT at the subsequent time and the representative value of each of the output clusters IT.

In this way, it is possible to predict the probability distribution in which the output data output at the subsequent (future) time belongs to each of the output clusters. Then, it is possible to calculate the predicted value of the output data output at the subsequent time as an expectation value (that is, a total of products of the representative values and the probability distributions of the output clusters IT (see Expression 6)) using the prediction result of the probability distribution and the representative value of each output cluster IT.

According to the first embodiment, the representative value of the output cluster IT can be a central value of the values of the output data belonging to the output cluster IT (for example, (upper limit of $IT_i$+lower limit of $IT_1$)/2).

In this way, since the representative value is a previously obtained constant, a calculation course of the predicted value of the output data can be simplified, and thus it is possible to reduce a load of the process.

In another embodiment, the representative value of the output cluster IT may be an average value of the output data belonging to the output cluster IT.

In this way, when the numbers of output data T and input data u are small and the distributions of the values of the output data T and the input data u are not uniform, accuracy of the predicted value is improved.

The monitoring device 20 according to the first embodiment performs the step of acquiring the output data T at the predetermined time from the device 100; the step of calculating the predicted value of the output data T at the predetermined time and calculating the difference between the predicted value and the output data T at the predetermined time; and the step of determining that the device 100 is normally operating when the calculated difference is equal to or less than the predetermined threshold.

In this way, since the actually measured value of the output data T at the predetermined time does not considerably deviate from the predicted value of the output data T at the same time, it can be identified that a current running of the device 100 is normal.

The monitoring device 20 according to the first embodiment performs the step of updating the transition probability matrix A based on the input data u and the output data T when the input data u and the output data T are acquired.

In this way, whenever given amounts of the input data u and the output data T are acquired, the new transition probability matrix A is calculated and output data is predicted based on the new transition probability matrix A. Thus, even when the characteristics of the device 100 running for a long time are transitionally changed, high accurate prediction is constantly maintained based on the transition probability matrix A in accordance with latest characteristics.

Second Embodiment

Next, a second embodiment will be described with reference to FIG. 13. The common description to the first embodiment will be omitted and only others will be described. In the second embodiment, accuracy of predicted values is improved by adjusting a range of values classified into the input clusters Iu and the output clusters IT.

FIG. 13 is a diagram illustrating an example of a method of setting the output clusters IT. In FIG. 13, a value of temperature which is an example of output data T0 is expressed as "T0+Kδ (K: 0 to 4095, δ: resolution). In the resolution, a value such as 0.01 degrees is set.

In FIG. 13, the number of values which can be the output data T is 4096 and the output data T is classified into seven output clusters that each have 586 pieces of output data. For example, when values of the output data T (temperature) are "T0 to T0+586δ," the output data is classified into the output cluster $IT_1$. When values of the output data T (temperature) are "T0+586δ" to T0+1171," the output data is classified into the output cluster $IT_2$.

The case in which the output clusters IT are set so that the number of values which can be the output data T included in each output cluster IT is equal has been described, but the output clusters IT may be divided so that the number of pieces of output data T classified into each output cluster IT is equal. For example, the monitoring device 20 may divide the output clusters IT so that the number of values which can be the output data T during a predetermined period is equal. The monitoring device 20 may change the setting of the output clusters IT at a predetermined timing so that the number of pieces of output data T is equal. Thus, since a statistical variation caused due to allocation of the output data T to the output clusters IT can be suppressed, it is possible to calculate an accurate transition probability matrix.

The method of setting the output clusters IT has been described, but the input clusters Iu can be, of course, set similarly.

[Others]

In the above-described embodiments, the case in which the predicted values of the output data of the device 100 disposed in the plant 10 are calculated and determining whether the device 100 is normally operating has been described, but the same, of course, applies to a device other than the device 100 disposed in the plant 10. For example, the predicted values may also be used to determine normality of an operation of a railroad vehicle or an airplane. Predicted values may be calculated based on input data and output data of one device 100 and may be used to determine normality of the same kind of device 100.

The opening degree of the valve and the temperature have been exemplified as the input data and the output data in the description, but the input data and the output data are not particularly limited as long as the input data and the output data are related to the monitoring target device 100 and are data series with a mutual correlation (combinations of "control input values" and "data indicating operation states" in the device 100). For example, the input data may be a pressure of a predetermined portion of the device 100 or the output data may be density or the like of a predetermined substance in the device 100.

The monitoring device 20 is an example of an information-processing device. The data acquisition unit 210 is an example of an acquisition unit. A specifying unit, an extraction unit, a totalizing unit, a counting unit, and a calculation unit are examples of the predicted value calculation unit 220. The transceiver unit 120 is an example of a transmission unit.

Various modifications and changes can be, of course, made within the scope of the gist of the present invention described in the claims unless particularly limited in the above description.

INDUSTRIAL APPLICABILITY

The information-processing method, the information-processing device, the program, and the information-processing system described above can appropriately estimate predicted values of time-series data based on time-series data at the time of operating a device.

REFERENCE SIGNS LIST

1 Monitoring system
10 Plant
20 Monitoring device
100 Device
210 Data acquisition unit
220 Predicted value calculation unit
230 Determination unit
240 Input and output unit
250 Device control unit
260 Information storage unit
120 Transceiver unit

The invention claimed is:

1. An information-processing method of calculating predicted values of data indicating an operation state of a device, the method comprising:
    a step of acquiring first data of the device during a predetermined period and second data that has a correlation with the first data by a monitoring device;
    a step of specifying first data clusters to which the first data belongs and second data clusters to which the second data belongs by the monitoring device;
    a step of extracting the first data belonging to one of the first data clusters and the second data acquired at a corresponding time as correspondent data by the monitoring device;
    a step of totalizing the number of pieces of correspondent data included in each of the second data clusters and calculating a total value for each second data cluster by the monitoring device;
    a step of specifying the second data clusters which are transition destinations of the correspondent data in a time subsequent to the corresponding time and counting the number of pieces of transition data which is the correspondent data transitioning from each of the second data clusters which are transition sources to the second data clusters which are the transition destinations by the monitoring device; and
    a step of calculating a transition probability matrix of the correspondent data based on the total values and the number of pieces of transition data and calculating predicted values of the second data based on the transition probability matrix by the monitoring device,
    wherein the step of calculating the predicted values of the second data includes
    a step of calculating a probability distribution of each of the second data clusters based on the number of pieces of second data belonging to the second data clusters by the monitoring device,
    a step of calculating a probability distribution of each of the second data clusters at a subsequent time based on the transition probability matrix and the probability distribution of each of the second data clusters by the monitoring device, and
    a step of calculating the predicted value from the probability distribution of each of the second data clusters at a subsequent time and a representative value of each of the second data clusters by the monitoring device,
    wherein the method further comprising:
    a step of acquiring the second data at a predetermined time from the device by the monitoring device;
    a step of calculating predicted values of the second data at the predetermined time and calculating differences between the predicted values and the second data at the predetermined time by the monitoring device;
    a step of determining a predetermined threshold based on a frequency of updating of the transition probability matrix by the monitoring device;
    a step of determining that the device operates normally when the differences calculated by the monitoring device are equal to or less than the predetermined threshold; and
    a step of controlling the device to perform a predetermined operation in response to the differences calculated by the monitoring device being greater than the predetermined threshold,
    wherein the first data is input values to the device which is a control target and the second data is output values from the device which is the control target.

2. The information-processing method according to claim 1,
    wherein the number of pieces of transition data is calculated for each combination of the second data clusters which are the transition sources and the second data clusters which are the transition destinations, and
    wherein each element of the transition probability matrix is calculated by dividing the number of pieces of transition data by the total value of the second data cluster to which the transition data belongs before the transition.

3. The information-processing method according to claim 1, wherein the representative value is a central value which is the output data belonging to the second data cluster.

4. The information-processing method according to claim 1, wherein the representative value is an average value of the output data belonging to the second data cluster.

5. The information-processing method according to claim 1, further comprising:
    a step of updating the transition probability matrix based on new first data and second data when the monitoring device acquires the new first data and second data.

6. The information-processing method according to claim 1, wherein a range of values of the second data classified to each of the second data clusters is set so that the numbers of pieces of second data classified to the second data clusters are equal.

7. The information-processing method according to claim 1, wherein the device is a boiler, a gas turbine, or a corrugator, the first data is an opening degree of a valve of the device and the second data is temperature data of the device.

8. An information-processing device that calculates predicted values of data indicating an operation state of a device, the device comprising:
    an acquisition unit configured to acquire first data of the device during a predetermined period and second data that has a correlation with the first data;
    a specifying unit configured to specify first data clusters to which the first data belongs and second data clusters to which the second data belongs;
    an extraction unit configured to extract the first data belonging to one of the first data clusters and the second data acquired at a corresponding time as correspondent data;
    a totalizing unit configured to totalize the number of pieces of correspondent data included in each of the second data clusters and calculate a total value for each second data cluster;
    a counting unit configured to specify the second data clusters which are transition destinations of the correspondent data in a time subsequent to the corresponding time and count the number of pieces of transition data which is the correspondent data transitioning from each of the second data clusters which are transition sources to the second data clusters which are the transition destinations; and
    a calculation unit configured to calculate a transition probability matrix of the correspondent data based on the total values and the number of pieces of transition data and calculate predicted values of the second data based on the transition probability matrix,
    wherein the calculation unit calculating the predicted values of the second data includes a first calculation unit configured to calculate a probability distribution of each of the second data clusters based on the number of pieces of second data belonging to the second data clusters, a second calculation unit configured to calculate a probability distribution of each of the second data clusters at a subsequent time based on the transition probability matrix and the probability distribution of each of the second data clusters, and a third calculation unit configured to calculate the predicted value from the probability distribution of each of the second data clusters at a subsequent time and a representative value of each of the second data clusters, a determination unit configured to:
  acquire the second data at a predetermined time from the device, calculate predicted values of the second data at the predetermined time and calculate differences between the predicted values and the second data at the predetermined time,
  determine a predetermined threshold based on a frequency of updating of the transition probability matrix,
  determine that the device operates normally when the differences calculated by the monitoring device are equal to or less than the predetermined threshold; and a device control unit configured to control the device to perform a predetermined operation in response to the differences calculated by the monitoring device being greater than the predetermined threshold, wherein the first data is input values to the device which is a control target and the second data is output values from the device which is the control target.

9. An information-processing system, comprising:
a device; and
an information-processing device that calculates predicted values of data indicating an operation state of the device,
wherein the device includes a transmission unit configured to transmit first data of the device during a predetermined period and second data that has a correlation with the first data to the information-processing device,
wherein the information-processing device includes
an acquisition unit configured to acquire the first data and the second data from the device;
a specifying unit configured to specify first data clusters to which the first data belongs and second data clusters to which the second data belongs;
an extraction unit configured to extract the first data belonging to one of the first data clusters and the second data acquired at a corresponding time as correspondent data;
a totalizing unit configured to totalize the number of pieces of correspondent data included in each of the second data clusters and calculate a total value for each second data cluster;

a counting unit configured to specify the second data clusters which are transition destinations of the correspondent data in a time subsequent to the corresponding time and count the number of pieces of transition data which is the correspondent data transitioning from each of the second data clusters which are transition sources to the second data clusters which are the transition destinations; and a calculation unit configured to calculate a transition probability matrix of the correspondent data based on the total values and the number of pieces of transition data and calculate predicted values of the second data based on the transition probability matrix, and wherein the calculation unit calculating the predicted values of the second data includes a first calculation unit configured to calculate a probability distribution of each of the second data clusters based on the number of pieces of second data belonging to the second data clusters, a second calculation unit configured to calculate a probability distribution of each of the second data clusters at a subsequent time based on the transition probability matrix and the probability distribution of each of the second data clusters, and a third calculation unit configured to calculate the predicted value from the probability distribution of each of the second data clusters at a subsequent time and a representative value of each of the second data clusters, a determination unit configured to:
  acquire the second data at a predetermined time from the device,
  calculate predicted values of the second data at the predetermined time and calculate differences between the predicted values and the second data at the predetermined time,
  determine a predetermined threshold based on a frequency of updating of the transition probability matrix, and
  determine that the device operates normally when the differences calculated by the monitoring device are equal to or less than the predetermined threshold; and a device control unit configured to transmit instructions to the device to perform a predetermined operation in response to the differences calculated by the monitoring device being greater than the predetermined threshold, wherein the first data is input values to the device which is a control target and the second data is output values from the device which is the control target.

10. The information-processing system according to claim 9, further comprising:
a plant,
wherein the device is disposed in the plant.

* * * * *